United States Patent [19]

Henry et al.

[11] 4,373,239

[45] Feb. 15, 1983

[54] FUSING MEMBER FOR ELECTROSTATOGRAPHIC COPIERS

[75] Inventors: Arnold W. Henry, Pittsford; Jack C. Azar; John Sagal, Jr., both of Rochester, all of N.Y.

[73] Assignee: Xerox Corporation, Stamford, Conn.

[21] Appl. No.: 125,404

[22] Filed: Feb. 27, 1980

[51] Int. Cl.$^3$ .......................... B21B 31/08; B60B 5/00

[52] U.S. Cl. ....................................................... 29/132

[58] Field of Search .......................................... 29/132

[56] References Cited

U.S. PATENT DOCUMENTS

| | | | |
|---|---|---|---|
| 3,902,845 | 9/1975 | Murphy | 29/132 X |
| 4,064,313 | 12/1977 | Takiguchi et al. | 29/132 X |
| 4,074,001 | 2/1978 | Imai et al. | 29/132 X |
| 4,125,362 | 11/1978 | Matsui et al. | 29/132 X |
| 4,149,797 | 4/1979 | Imperial | 29/132 X |
| 4,170,957 | 10/1979 | Eddy et al. | 29/132 X |
| 4,199,626 | 4/1980 | Stryjewski et al. | 29/132 X |
| 4,207,059 | 6/1980 | Gaitten et al. | 29/132 X |

*Primary Examiner*—Wayne L. Shedd

[57] ABSTRACT

A novel fuser roll is disclosed which has a rigid core and having coated on the core a thin layer of a composition which comprises the crosslink product of a mixture of about 100 parts by weight of $\alpha,\omega$-hydroxypolydimethylsiloxane, about 128 to 250 parts by weight of finely divided tabular alumina, about 13 to 50 parts by weight of a finely divided iron oxide, together with effective amounts of a crosslinking agent and a crosslinking catalyst.

10 Claims, 3 Drawing Figures

FUSING MEMBER FOR ELECTROSTATOGRAPHIC COPIERS

This invention relates to a novel fusing or fixing member for electrostatographic copiers.

BACKGROUND OF THE INVENTION AND PRIOR ART STATEMENT

As indicated in U.S. Pat. No. 4,078,286, in a typical process for electrophotographic duplication, a light image of an original to be copied is recorded in the form of a latent electrostatic image upon a photosensitive member, and the latent image is subsequently rendered visible by the application of electroscopic particles, which are commonly referred to as toner. The visible toner image is then in a loose powdered form and it can be easily disturbed or destroyed. The toner image is usually fixed or fused upon a support, which may be the photosensitive member itself or another support such as a sheet of plain paper. The present invention relates to the fusing of the toner image upon a support.

In order to fuse electroscopic toner material onto a support surface permanently by heat, it is necessary to elevate the temperature of the toner material to a point at which the constituents of the toner material coalesce and become tacky. This heating causes the toner to flow to some extent into the fibers or pores of the support member. Thereafter, as the toner material cools, solidification of the toner material causes the toner material to be firmly bonded to the support.

The use of thermal energy for fixing toner images onto a support member is well known. Several approaches to thermal fusing of electroscopic toner images have been described in the prior art. These methods include providing the application of heat and pressure substantially concurrently by various means: a roll pair maintained in pressure contact; a flat or curved plate member in pressure contact with a roll; a belt member in pressure contact with a roll; and the like. Heat may be applied by heating one or both of the rolls, plate members or belt members. The fusing of the toner particles takes place when the proper combination of heat, pressure and contact time are provided. The balancing of these parameters to bring about the fusing of the toner particles is well known in the art, and they can be adjusted to suit particular machines or process conditions.

During operation of a fusing system in which heat is applied to cause thermal fusing of the toner particles onto a support, both the toner image and the support are passed through a nip formed between the roll pair, or plate or belt members. The concurrent transfer of heat and the application of pressure in the nip effects the fusing of the toner image onto the support. It is important in the fusing process that no offset of the toner particles from the support to the fuser member takes place during normal operations. Toner particles offset onto the fuser member may subsequently transfer to other parts of the machine or onto the support in subsequent copying cycles, thus increasing the background or interfering with the materials being copied there. The so called "hot offset" occurs when the temperature of the toner is raised to a point where the toner particles liquify and a splitting of the molten toner takes place during the fusing operation. "Cold offset" may be caused, even at the temperatures below the molten point of the toner, by such factors as imperfections in the surface of the fusing members; by the toner particles being insufficiently adhering to the support; by electrostatic forces which may be present; etc.

Another problem frequently encountered in fusing with a heated member is that the substrate, e.g. a sheet of paper, on which the toner image is fused may curl and/or adhere to the heated fuser. Such adhering paper will tend to wrap itself around the fuser and thus prevent the fuser from performing its intended operations in subsequent copying cycles. Such adhering paper must be generally removed by hand, resulting in much manual labor and machine downtime.

As indicated in said U.S. Pat. No. 4,078,286, it is known in the prior art to provide the heated member in a fusing system with a covering of a heat-resistant, release material on its outer surface. Coupled to such a heated member is a backup or pressure member covered with a heat-resistant, flexible material. The nip is formed by the flexible material under pressure contact with the heated member. Examples of the heat resistant, release materials for the fuser members include polytetrafluoroethylene, silicone rubber, fluorocarbon elastomers and the like. A suitable offset preventing liquid may be used on the fuser member to minimize or avoid "offsetting." Silicone oils are widely used as the offset preventing or release agent. The pressure member may be made of such materials as silicone rubber and polyfluoroethylenepropylene.

Both said U.S. Pat. No. 4,078,286 and U.S. Pat. No. 4,064,313 relate to the use of silicone rubber as a coating material on a fuser member and the problem of adhering the coating of the silicone rubber to the base member to prevent the separation of the silicone rubber coating from the base member.

In U.S. Pat. No. 3,809,854, there is disclosed a composite article useful as a fuser blanket which is made of a dimensionally stable substrate having bonded to one surface thereof an electrically conductive layer of a resiliently compressible elastomer, and a thin resiliently compressible silicon elastomer outer layer bonded thereto. Examples of the electrically conductive resiliently compressible elastomer include a peroxide cured vinyl methyl polysiloxane polymer containing therein an antistatic or conductive material such as a peroxide curable carbon black filled polysiloxane. The thin resiliently compressible silicone elastomer outer layer may be made of the cured or further polymerized product of a silicone gum such as a dimethyl vinyl polysiloxane.

Canadian Pat. No. 658,954 discloses a method of preparing silicone rubber compositions which comprise an essentially water free mixture of a hydroxyl endblocked diorganosiloxane polymer, a crosslinking agent, a crosslinking catalyst and optionally an essentially anhydrous filler. Aside from other differences in the composition of the present invention and that of the Canadian patent, the fillers there are entirely different from those of the present invention. The compositions of the Canadian patent are intended for use as sealants, electrical insulations, coatings, dental cement, etc.

U.S. Pat. No. 3,231,572 discloses a process for rapid curing at ambient temperature of organopolysiloxanes. The composition of this patent comprises a mixture of hydroxyl terminated diorganopolysiloxane, a crosslinking agent, fillers, and an accelerator which is made of an organic derivative of tin in combination with a mono-, di- or trichloracetic acid. The mixture so prepared is intended for use as caulking, coating, lining, etc.

U.S. Pat. No. 3,795,033 discloses a roll for fusing toner images to a sheet, which has coated on its exterior surface a mixture of a silicone gum, fillers, and a curing agent.

In U.S. Pat. No. 3,848,305 there is disclosed a fuser roll coated with a silicone elastomer, which is made of a polydimethyl siloxane, a trifunctional silane, silicon dioxide, and ferric oxide. A dibutyltin dilaurate catalyst is also used in preparing the elastomer.

Finally, in U.S. Pat. No. 4,074,001, there is disclosed a fixing roll for electrophotography having a surface layer made of a diorganopolysiloxane having silanol groups at the molecular terminals, a diorganopolysiloxane having trialkylsilyl groups at the molecular terminals, an alkoxy-containing silane, a metal salt of an organic acid as the crosslinking catalyst, a powdery calcium carbonate, iron oxide, and titanium dioxide.

While the prior art fusers have been effective in providing the fusing of thousands of copies between servicing and/or replacement of the fuser member, there is a continuing need to improve the life of the fusing member, the copy quality resulting from the fusing operation, and the release properties of the fusing member.

Accordingly, it is an object of the invention to provide an improved fusing member for use in an electrostatographic copying machine.

It is another object of the present invention to provide a fusing member which yields high quality copies, extended life cycles, as well as possessing superior release properties.

It is still another object of the invention to provide a novel fuser member suitable for use in a cold pressure fixing apparatus.

SUMMARY OF THE INVENTION

The above objects are accomplished in accordance with the present invention by coating the outside surface of a fusing member with a thermally conductive and resiliently compressible material which has high thermomechanical strength and good release properties. The preferred composition of the present invention is made of 100 parts by weight of an $\alpha,\omega$-hydroxy polydimethylsiloxane having a number average molecular weight of about 5,000 to 20,000, about 128 to 250 parts by weight of a finely divided tabular alumina, about 13 to 60 parts by weight of finely divided iron oxide, about 6 to 9 parts by weight of a crosslinking agent, and about 0.25 to 1.8 parts by weight of a crosslinking catalyst. This composition may be cured and coated onto a fuser member at a thickness about 10 to 100 mils.

DETAILED DESCRIPTION OF THE INVENTION

Figure 1:
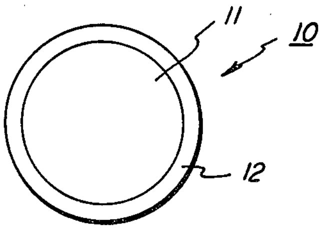
FIG. 1 shows a cross-sectional view of a fuser roll of the present invention.

FIG. 1 shows a fuser roll 10 made with an outer layer of the composition of the present invention. Although the fuser member shown in FIG. 1 is in the form of a roll, it is to be understood that the present invention is applicable to fuser members of other shapes, such as plates or belts. In FIG. 1, the fuser roll 10 is composed of a core 11 having coated thereon a thin layer 12 of the composition of the present invention. The core 11 may be made of various metals such as iron, aluminum, nickel, stainless steel, etc., and various synthetic resins. We prefer to use aluminum as the material for the core 11, although this is not critical. The core 11 is hollow and a heating element (not shown) is generally positioned inside the hollow core to supply the heat for the fusing operation. Heating elements suitable for this purpose are known in the prior art and may comprise a quartz heater made of a quartz envelope having a tungsten resistance heating element disposed internally thereof. The method of providing the necessary heat is not critical to the present invention, and the fuser member can be heated by internal means, external means or a combination of both. All heating means are well known in the art for providing sufficient heat to fuse the toner to the support. The composition of layer 12 will be described in detail below.

Figure 2:
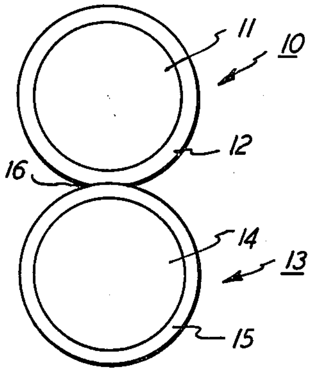
FIG. 2 represents a cross-sectional view of the fuser roll of FIG. 1 as a part of a roll pair, and maintained in pressure contact with a backup or pressure roll.

Referring to FIG. 2, the fuser roll 10 is shown in a pressure contact arrangement with a backup or pressure roll 13. The pressure roll 13 comprises a metal core 14 with a layer 15 of a heat-resistant material. In this assembly, both the fuser roll 10 and the pressure roll 13 are mounted on shafts (not shown) which are biased so that the fuser roll 10 and pressure roll 13 are pressed against each other under sufficient pressure to form a nip 16. It is in this nip that the fusing or fixing action takes place. It has been found that the quality of the copies produced by the fuser assembly is better when the nip is formed by a relatively hard and unyielding layer 15 with a relatively flexible layer 12. In this manner, the nip is formed by a slight deformation in the layer 12 due to the biasing of fuser roll 10 and the pressure roll 13. The layer 15 may be made of any of the well known materials such as polyfluoroethylenepropylene or a silicone rubber.

Figure 3:
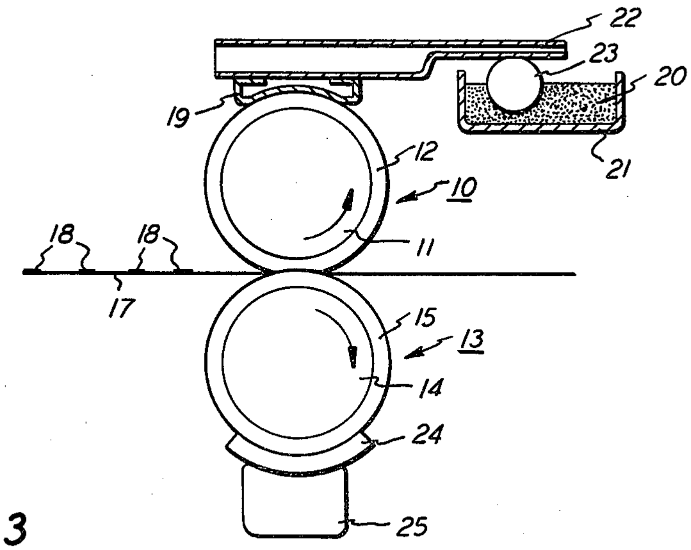
FIG. 3 is a schematic view of a pressure contact fuser assembly which employs the fuser member of the present invention.

FIG. 3 shows a pressure contact heated fuser assembly having a sheet of a support material 17, such as a sheet of paper, bearing thereon toner image 18 passing the fuser roll 10 and pressure roll 13. On fuser roll 10 is mounted an intermediate oil-feeding member 19 from which an offset preventing fluid or release agent 20 is applied to the fuser roll 10. Such release agents are known to the art and may be, for example, a silicone oil. The intermediate oil feeding member 19 also performs the function of cleaning the fuser roll 10. The release agent 20 in sump 21 is fed to the oil feeding member 19 through another intermediate oil feeding member 22 and a feeding roll 23. The pressure roll 13 is in contact with a cleaning member 24 mounted on a supporting member 25.

While the novel fuser member of the present invention has been described with reference to heat fixing or fusing of toner images, it is to be understood that the invention may be also used in cold pressure fixing since the excellent release properties and conformability of the fuser member make it suited for the latter application as well.

In accordance with the present invention, a novel fuser member is provided which is particularly suited for use in the heat fixing of toner images in an electrostatographic copying machine. The coating on the fuser member of the present invention is thermally conductive, has high thermomechanical strength, is flexible and conformable so that it can form a nip with a relatively hard pressure roll, and it possesses outstanding release properties and long life. The coating composition comprises:

(a) 100 parts of an $\alpha,\omega$-hydroxy polydimethylsiloxane having a number average molecular weight of between about 5,000 to 20,000;

(b) about 128 to 250 parts by weight of a finely divided tabular alumina;

(c) about 13 to 60 parts by weight of a finely divided iron oxide;

(d) about 6 to 9 parts by weight of a crosslinking agent; and (e) about 0.25 to 1.8 parts by weight of a crosslinking catalyst.

We have found the $\alpha,\omega$-hydroxypolydimethylsiloxane to be a particularly suitable material for overcoating a thermally conductive conformable fuser roll. The $\alpha,\omega$-hydroxypolydimethylsiloxane, which is a disilanol, is believed to have the structural formula:

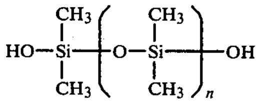

wherein n is an integer whose magnitude depends on the number average molecular weight of the disilanol. For the purposes of the present invention, we prefer to use a disilanol having a number average molecular weight between about 5,000 to 20,000. In commercially available materials, this number average molecular weight corresponds roughly to materials having an average viscosity ranging from about 500 centistokes (Cstk) to about 3,500 Cstk. With a disilanol having a number average molecular weight of less than about 5,000, which roughly corresponds to an average viscosity of about less than 500 Cstk, the material is of relatively short chains and therefore contains more active sites at the ends of the chains for crosslinking during the curing step. This yields a material which contains too high a crosslinking density, and which is relatively hard and brittle and not suited for the purposes of the present invention.

With a disilanol having a number average molecular weight in excess of about 20,000, which roughly corresponds to an average viscosity of about above 3,500 Cstk, the cured composition does not have sufficient crosslinking density to attain maximum strength and fatigue resistance, and therefore does not have sufficiently long operational life.

The alumina is incorporated in the composition to improve the thermal conductivity of the resultant composition. An important aspect of the present invention resides in the use of tabular alumina. The other commonly available form of alumina, calcined alumina, is unsuitable per se. Tabular alumina is a sintered alumina that has been heated to a temperature slightly below 3700° F., the fusion point of aluminum oxide. Due to this high temperature treatment during its manufacturing process, it is believed that tabular alumina has a more coalesced surface than calcined alumina, which is generally prepared at a much lower temperature. It is further believed that the coalesced surface of tabular alumina results in less interaction between the tabular alumina and the disilanol polymer, which leads to other and desirable results. The name "tabular" came from the fact that the material is composed predominantly of tablet-like crystals. This material is characterized by good thermal conductivity and chemical inertness. For the purposes of the present invention, the size of the tabular alumina used is important. The tabular alumina must be finely divided and be not larger than about 100 mesh in size. At the present time, the finest size tabular alumina commercially available is 325 mesh, corresponding to a maximum size of about 44 micrometers. We have found this sized tabular alumina to be very suitable for the purposes of the present invention.

The amount of tabular alumina employed is important. Sufficient amount of the tabular alumina should be employed to give the resultant composition a desired level of thermal conductivity. On the other hand, an excess of tabular alumina in the composition tends to cause degradation of the thermomechanical strength of the composition as well as to adversely affect the release properties of the composition. We have found that between about 128 to 250 parts by weight of tabular alumina per 100 parts by weight of the disilanol polymer to produce a composition which has high thermal conductivity, high mechanical strength, good fatigue life and good release properties. Within this range, we particularly prefer to use about 189–233 parts by weight of tabular alumina per 100 parts of the disilanol polymer.

Another important aspect of the present invention resides in finely divided iron oxide. We prefer to use iron oxide which has a particle size in the range of submicron up to about 1 micrometer in its number average particle size. In particular, iron oxide is commercially available in a 0.4 micrometer size, and we have found this to be satisfactory. The amount of the iron oxide employed is an important factor. It is believed that the iron oxide serves the function of a reinforcing agent in the composition. We have found between about 13 to 60 parts by weight iron oxide per 100 parts by weight of the disilanol polymer to be suitable. Using insufficient amounts of iron oxide will result in a composition which is relatively low in mechanical strength and has poor swell characteristics under mechanical stress and in the presence of typical release agents. Excessive amounts of iron oxide in the composition yields a material which becomes relatively hard and thus requires more mechanical energy to obtain the desired nip size on a fuser roll, which also leads to shorter fatigue life for the fuser roll. Within this range, we particularly prefer to use about 13 to 28 parts by weight iron oxide per 100 parts by weight of the disilanol polymer.

The crosslinking agent used in the composition for coating the fuser member of the present invention is for the purpose of obtaining a material with sufficient crosslink density to attain maximum strength and fatigue resistance. Examples of crosslinking agents which are suitable for the purposes of the present invention include: esters of orthosilicic acid; esters of polysilicic acid; and alkyltrialkoxy silanes. Specific examples of suitable crosslinking agents include: tetramethylorthosilicate; tetraethylorthosilicate; 2-methoxyethylsilicate; tetrahydrofurfurylsilicate; ethylpolysilicate; butylpolysilicate; etc. Alkoxysilanes simultaneously containing hydrogen bound to the silicon atom, such as methyldiethoxysilane or triethoxysilane, are very suitable as are polyalkylhydrosilanes. Other suitable crosslinking agents are known to the art. We particularly prefer to use condensed tetraethylorthosilicate as the crosslinking agent in the composition of the invention. The amount of the crosslinking agent employed is not critical, as long as sufficient amount is used to completely crosslink the active end groups on the disilanol polymers used. In this respect, the amount of crosslinking agent required depends on the number average molecular weight of the disilanol polymer employed. With the higher average molecular weight polymer, there are fewer active end groups present and thus a lesser amount of the crosslinking agent is required, and vice versa. When excess amounts of a crosslinking agent are used, the excess is easily removed from the cured composition. Generally, for the preferred disilanol polymer of a number average molecular weight of between about 5,000 to 20,000, we have found that between about 6 to 9 parts by weight of condensed tetraethylorthosilicate per 100 parts by weight of the disilanol polymer to be suitable. Within this range, we prefer to use about 6.6 to 8 parts by weight condensed tetraethylorthosilicate per 100 parts by weight of the disilanol polymer. Of course, if other crosslinking agents are used, the amount to be used should be adjusted stoichiometrically to provide a sufficient amount of the crosslinking agent for the reactive end groups in the disilanol polymer.

Finally, with respect to the crosslinking catalyst used in the composition of the present invention, such catalysts are well known in the art and they include: the amines and carboxylic salts of many metals, such as lead, zinc, zirconium, antimony, iron, cadmium, tin, barium, calcium, and manganese; particularly the naphthenates, octoates, hexoates, laurates and acetates. Examples of suitable catalysts include: stannous octoate; dibutyltin dilaurate; dibutyltin diacetate; and dibutyltin dicaproate. Bis(dibutylchlorotin) oxide and similar compounds can be also used. Other suitable catalysts are disclosed in U.S. Pat. No. 3,664,997. The amount of the catalyst employed is not critical. However, too small an amount of catalyst used leads to a very slow reaction which is impractical. On the other hand, excessive amounts of catalyst may cause a breakdown of the crosslinked polymer network at high temperatures, to yield a less crosslinked and weaker material, thus adversely affecting the thermomechanical strength of the cured material. In general, we have found that between about 0.25 to 1.8 parts by weight of catalyst per 100 parts of the disilanol polymer to be preferred. More particularly, we prefer to use between 0.25 to 0.75 parts by weight of catalyst per 100 parts of the polymer. The specific catalysts preferred are dibutyltin dilaurate and bis(dibutylchlorotin)oxide.

The invention will now be described with reference to the following specific examples.

EXAMPLE I 180 grams of Rhodorsil 48V750 disilanol, obtained from the Rhone-Poulenc Company and believed to contain an $\alpha,\omega$-hydroxy polydimethylsiloxane having an average viscosity of about 750 Cstk, was mixed with 420 grams of Rhodorsil 48V3500 disilanol, which is believed to be an $\alpha,\omega$-hydroxy polydimethylsiloxane having an average viscosity of about 3500 Cstk. The mixture is believed to be a disilanol having a number average molecular weight of about 15,500. The mixture was in a Baker-Perkins Model AN2 mixer which was equipped with thermostatically controlled electrical heaters. To this mixture was added 1284 grams of Alcoa T61 tabular alumina, 325 mesh, over a period of about 10 minutes. Then 150.6 grams of a Mapico Red 297 iron oxide, having an ultimate particle size of about 0.4 micrometer, was added to the mixture over a period of 10 minutes and the mixture was blended for about 2½ hours at room teperature. To this mixture was added 45 grams of a Silbond condensed ethyl silicate, from the Stauffer Chemical Company, and mixing was continued for 1 hour. To this mixture was then added 3 grams of dibutyltin dilaurate catalyst and the mixture was then made into rubber pads for mechanical testing, and it was also coated onto aluminum rolls at a thickness between 60 to 70 mils for testing as fuser rolls. After the composition was made into those shaped articles, it was brought to a temperature of 158° F. and cured for a period of 3 hours.

The pads were found to have a pad durometer (Shore A) of 71; a modulus of elasticity, M10(PSI), of 715; a tensile strength (PSI) of 620; and an ultimate elongation of 80 percent.

The coated fuser rolls were placed in a test apparatus simulating a xerographic copying machine fusing system. The coated fuser rolls were operated at a circumferential roll speed of about 15 inches per second, with a biasing force between the fuser roll and a pressure roll of about 30 pounds per linear inch along the length of the fuser roll. The surface of the coated fuser roll was maintained at a temperature of about 385° F. A release agent of a 60,000 Cstk silicone oil was used on the fuser roll. The roll was operated at a 10 percent duty cycle, with 90 percent of the test period being at a standby temperature, to simulate actual working conditions. The coated fuser rolls were found to have an average operating life under such conditions of about 3000 hours, which is roughly equivalent to between 1 year to 1½ years of actual use.

The coated fuser rolls were found to have excellent thermal conductivity and release properties, and the copy paper being fused showed only very slight tendency to follow the roll or wrap around the roll. That slight tendency to follow the roll was easily corrected by the use of a non-contact guide to assist the stripping of the paper from the roll.

EXAMPLE II

The apparatus of Example I was used and the procedure of that example was generally followed in this example. 600 grams of Rhodorsil 48V 750 disilanol was heated to 260° F. with mixing and then 1596 grams of Alcan C75 calcined alumina, with an average particle size of about 4 micrometers, was added to the mixture over a period of about 10 minutes, with the temperature of the mixture maintained at about 250° to 270° F. Mixing was continued at this temperature for an additional 10 minutes, thereafter the heater was turned off and mixing was continued for 2 hours while the mixture was being cooled. The mixture was allowed to cool to about 90° F. without stirring. Then the mixing was resumed with the addition of 28.4 grams of Silbond condensed ethyl silicate. The mixture was mixed for 1 hour at room temperature and then 3 grams of dibutyltin dilaurate was added. The mixture was then made into pads and also coated onto aluminum rolls, and then brought to a temperature of 140° F. and cured for 16 hours.

The pads so made were found to have a thermal conductivity of about $1.8\times10^{-3}$ cal./sec. cm°C.; a pad durometer (Shore A) of about 85; a modulus M10(PSI) of about 1150; a tensile strength (PSI) of about 510; and an ultimate elongation of about 70%.

The fuser rolls made with the composition of this example were tested for release properties and they were found to have poorer release properties than the fuser rolls made with the cured composition of Example I. The fuser rolls made with the composition of this example required an air puffer to assist in loosening copy paper having a dark lead edge from the roll. Without such a puffer, there is a tendency for the copy paper to wrap around the roll after about 1000 copies have been made on the fuser roll. There was also a recognizable increase in the hot offset of toner materials with the use of the fuser rolls of this example, as compared to the fuser rolls of Example I.

EXAMPLE III

A silicone rubber obtained for testing and developmental purposes was coated onto fuser rolls under the procedures of Example I. This silicone rubber has about 100 parts by weight of a disilanol, about 170 parts by weight of silica, about 14 parts by weight of iron oxide, about 8 parts by weight of a crosslinking agent and about 0.5 parts by weight of a catalyst. The fuser roll made from this composition was found to have release characteristics poorer than the fuser rolls of Example II. Higher volumes of air were needed in the air puffer to loosen the dark lead edges of copy paper to strip the paper from the roll. Fused copy papers show a curl after leaving the fuser roll. The fused copy paper shows an immediate tendency to wrap itself around the roll. Due to the poor release performance of this fuser roll, mechanical strength and roll life tests were not performed.

EXAMPLE IV

The procedure of Example I was repeated except that the amounts of the tabular alumina and iron oxide were changed. 1506 grams of Alcoa T61 tabular alumina and 18.8 grams of Mapico Red iron oxide were mixed in the composition of this example. The fuser rolls made from the composition of this example were tested under the same conditions as the fuser rolls of Example I. The fuser rolls of this example yielded a roll life of about 1260 hours.

EXAMPLE V

The procedure of Example I is repeated except that no iron oxide was employed in this example. 500 grams of Rhodosil 48 V 3500, 1265 grams Alcoa T61, 325 mesh, tabular alumina, 33 grams of Silbond condensed ethyl silicate, and 3.75 grams of dibutyltin dilaurate were mixed, poured into a pad mold, and brought to a temperature of 145° F. and cured for 18 hours.

The pads made from this composition were found to have a pad durometer (Shore A) of about 62; a modulus of elasticity M10 (PSI) of about 470; a tensile strength of about 450 PSI; and an ultimate elongation of about 80%.

In comparison with the material made in accordance with Example I, the composition of this example is a considerably weaker rubber and hence not suitable for the preparation of long life fuser rolls. Accordingly, no further tests were performed on this material in the fuser roll configuration.

EXAMPLE VI

A high temperature vulcanizing silicone rubber (HTV) obtained from SWS Silicones Corporation, designated as C501 material, was coated onto fuser rolls under procedures of Example I. This material is believed to have about 100 parts by weight of polydimethylsiloxane, about 200 parts by weight of silica, and about 2.5 parts by weight of 2,4-dichlorobenzoyl peroxide as the curing agent. Rolls were made by coating and curing the composition on aluminum rolls with the coating at about 60 to 70 mils thick. This material was cured for 15 minutes at 240° F.

The fuser roll made with the composition of this example were tested in accordance with the procedure of Example I. These fuser rolls were found to require an air puffer to assist in loosening copy paper having a dark lead edge from the roll. Without such a puffer, there is a tendency for the copy paper to wrap around the roll after about 1,000 copies have been made on the fuser roll. There was also a recognizable increase in the hot offset of toner materials with the use of the fuser rolls of this example as compared to the fuser rolls of Example I. In addition, the thermal conductivity of the cured composition of this example is not as good as that of Example I. Thus, the fuser rolls made in accordance with this example cannot be used in copying machines at as high a speed as the fuser rolls made in accordance with Example I would permit.

EXAMPLE VII

The procedure of Example I is repeated with the following materials: 240 grams of Rhodosil 48 V 750 disilanol; 560 grams of Rhodosil 48 V 3500 disilanol; and 800 grams of Mapico Red 297 iron oxide. This mixture was mixed for five hours and then 60 grams of condensed ethylsilicate was added and mixed for another hour. 8 grams of dibutyltin dilaurate were added to the mixture and after thorough mixing, the mixture was poured into a pad mold, and brought to a temperature of 158° F. and cured for three hours.

The pads made from this composition were found to have a pad durometer (Shore A) of about 54; a modulus of elasticity M10 (PSI) of about 560; a tensile strength of about 360 PSI; and an ultimate elongation of 80%.

In comparison with the material made in accordance with Example I, the composition of this example is a considerably weaker rubber and hence not suitable for the preparation of long life fuser rolls. In addition, the thermal conductivity of this material is lower than that of the material of Example I. Accordingly, as in Example V, no further tests were performed on this material in the fuser roll configuration.

While the invention has been described in detail with reference to specific and preferred embodiments, it will be appreciated that various modifications may be made from the specific details without departing from the spirit and scope of the invention.

What is claimed is:

1. A thermally conductive fuser member for use in an electrographic copying machine comprising a relatively rigid base and a thin layer of a composition coated on said base, said composition comprising the crosslinked product of a mixture of about 100 parts by weight of alpha, omega-hydroxypolydimethylsiloxane, about 128 to 250 parts by weight of finely divided tabular alumina, about 13 to 60 parts by weight of finely divided iron oxide particles, a sufficient amount of a crosslinking agent, and an effective amount of a crosslinking catalyst.

2. A thermally conductive fuser member of claim 1 wherein said base is a metallic roll, and wherein said thin layer is about 10 to 100 mils thick.

3. A thermally conductive fuser member of claim 2 wherein said metallic roll is made of aluminum, and wherein said thin layer is about 30 to 80 mils thick.

4. A thermally conductive fuser member of claim 3 wherein said thin layer is about 60 to 70 mils thick.

5. A thermally conductive fuser member of claim 3 wherein said alpha, omega-hydroxypolydimethylsiloxane has a number average molecular weight between about 5,000 to 20,000, wherein said crosslinking agent is about 6 to 9 parts by weight of condensed tetraethylorthosilicate, and wherein said crosslinking catalyst is about 0.25 to 1.8 parts by weight of dibutyltin dilaurate or bis(dibutylchlorotin)oxide.

6. A thermally conductive fuser member of claim 5 wherein said tabular alumina is about 325 mesh in size, and wherein said iron oxide particles have a number average particle size of about less than 1 micrometer.

7. A thermally conductive fuser member of claim 6 wherein said tabular alumina is present in an amount about 189–233 parts by weight, wherein said iron oxide present in an amount about 13–28 parts by weight, wherein said condensed tetraethylorthosilicate is present in an amount about 6.6 to 8 parts by weight, and wherein said catalyst is present in an amount about 0.25 to 0.75 parts by weight.

8. A thermally conductive fuser member of claim 7 wherein said thin layer is about 60–70 mils thick.

9. A thermally conductive fuser member of claim 7 wherein said tubular alumina is present in an amount about 189 parts by weight, wherein said iron oxide is present in an amount about 28 parts by weight, wherein said condensed tetraethylorthosilicate is present in an amount about 7.5 parts by weight, and wherein said catalyst is present in an amount about 0.5 parts by weight.

10. A thermally conductive fuser member for use in an electrographic copying machine comprising a relatively rigid base and a thin layer of a composition coated on said base, said composition comprising the crosslinked product of a mixture of about 100 parts by weight of alpha, omega-hydroxypolydimethylsiloxane which has a number average molecular weight between about 5,000 to 20,000, about 128 to 250 parts by weight of finely divided tabular alumina, about 13 to 60 parts by weight of finely divided iron oxide particles, a sufficient amount of a crosslinking agent, and an effective amount of a crosslinking catalyst.

* * * * *